(12) United States Patent
Williams et al.

(10) Patent No.: US 9,222,607 B2
(45) Date of Patent: Dec. 29, 2015

(54) THREADED CONNECTION WITH METAL TO METAL SEAL CAPABLE OF EXPANSION

(75) Inventors: Jeffrey C. Williams, Cypress, TX (US); Mark K. Adam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 637 days.

(21) Appl. No.: 12/899,647

(22) Filed: Oct. 7, 2010

(65) Prior Publication Data

US 2011/0133448 A1     Jun. 9, 2011

Related U.S. Application Data

(60) Provisional application No. 61/266,839, filed on Dec. 4, 2009.

(51) Int. Cl.
*F16L 15/00* (2006.01)

(52) U.S. Cl.
CPC ..................... *F16L 15/009* (2013.01)

(58) Field of Classification Search
CPC ............... F16L 15/004; F16L 15/009
USPC ............... 285/333, 334, 382.1, 382.2, 382.4, 285/385.5
See application file for complete search history.

(56) References Cited

U.S. PATENT DOCUMENTS

| | | | | |
|---|---|---|---|---|
| 4,192,533 A * | 3/1980 | Blose | ............................ | 285/334 |
| 4,521,042 A * | 6/1985 | Blackburn et al. | ............ | 285/334 |
| 4,662,659 A * | 5/1987 | Blose et al. | .................... | 285/334 |
| 4,671,544 A * | 6/1987 | Ortloff | ............................ | 285/334 |
| 4,676,529 A * | 6/1987 | McDonald | ....................... | 285/92 |
| 4,753,460 A * | 6/1988 | Tung | ............................. | 285/331 |
| 4,893,844 A * | 1/1990 | Chelette et al. | ............... | 285/113 |
| 5,029,906 A * | 7/1991 | Chelette et al. | ............... | 285/113 |
| 5,415,442 A | 5/1995 | Klementich | | |
| 5,462,315 A | 10/1995 | Klementich | | |
| 5,765,836 A * | 6/1998 | Banker et al. | ................. | 277/603 |
| 6,322,110 B1 | 11/2001 | Banker et al. | | |
| 6,347,814 B1 * | 2/2002 | Cerruti | ........................... | 285/334 |
| 6,554,287 B1 | 4/2003 | Sivley, IV et al. | | |
| 6,581,980 B1 * | 6/2003 | DeLange et al. | ............. | 285/334 |
| 6,712,401 B2 * | 3/2004 | Coulon et al. | ................ | 285/331 |
| 6,792,665 B2 | 9/2004 | Baugh et al. | | |
| 7,086,669 B2 * | 8/2006 | Evans et al. | ................. | 285/382.2 |
| 7,513,534 B2 * | 4/2009 | Noel et al. | ..................... | 285/334 |
| 7,585,002 B2 | 9/2009 | Curley et al. | | |
| 8,042,842 B2 | 10/2011 | Dubedout et al. | | |
| 2003/0067166 A1 | 4/2003 | Sivley, IV | | |
| 2004/0021314 A1 * | 2/2004 | Pina et al. | ........................ | 285/94 |
| 2004/0090068 A1 * | 5/2004 | Evans et al. | .................... | 285/382 |
| 2005/0236834 A1 | 10/2005 | Curley et al. | | |
| 2007/0035131 A1 | 2/2007 | Benzie | | |
| 2008/0265569 A1 * | 10/2008 | Carcagno et al. | ............ | 285/220 |
| 2008/0296894 A1 * | 12/2008 | Bailey et al. | .................. | 285/334 |
| 2012/0325316 A1 | 12/2012 | Cotte et al. | | |

FOREIGN PATENT DOCUMENTS

FR     2834326 A1 *  7/2003   ............. F16L 15/00

* cited by examiner

*Primary Examiner* — James Linford
(74) *Attorney, Agent, or Firm* — Steve Rosenblatt

(57) ABSTRACT

A retaining device for a threaded connection that is expanded holds the connection together to prevent leakage. In a two step thread the retention device is located between the steps and comprises a nose in a groove that holds aligned surfaces together for a metal to metal connection and allows for relative axial movement at the same time.

14 Claims, 2 Drawing Sheets

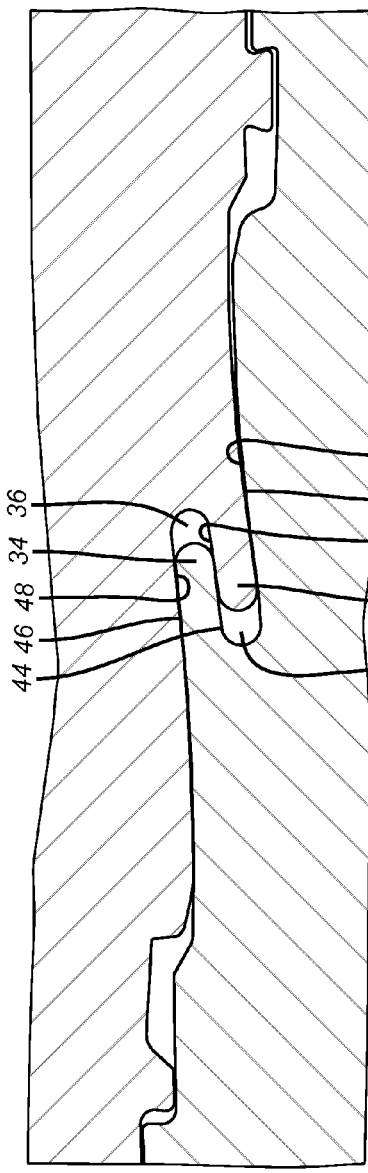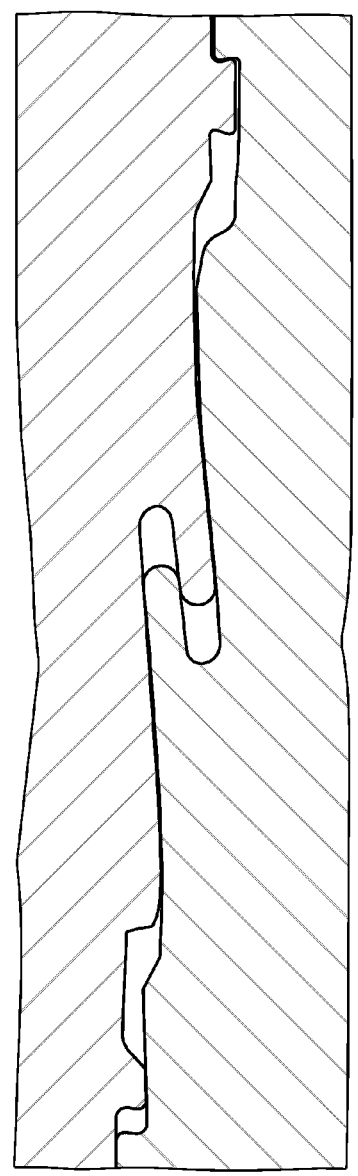

THREADED CONNECTION WITH METAL TO METAL SEAL CAPABLE OF EXPANSION

CROSS-REFERENCE TO RELATED APPLICATION

This application claims the benefit of U.S. Provisional Patent Application Ser. No. 61/266,839 filed Dec. 4, 2009.

FIELD OF THE INVENTION

The field of the invention is threaded connections and more particularly connections for subterranean use and most particularly connections that are expanded as part of a tubular string that extends to a subterranean location.

BACKGROUND OF THE INVENTION

Tubular strings are formed with threaded connections made up at the surface with tongs and then run in downhole to a desired location. More recently the assembled tubular string is expanded after it is properly positioned downhole. The string can be expanded into another preexisting string already in the wellbore that can have a bell at the lower end so that after expansion both connected strings have a common inside diameter. Other configurations can occur that call for expansion of all or part of a tubular string where the length of the expansion includes the threaded joints that connect the tubulars that make up the string.

The problem that occurs when a threaded connection is expanded and some separation occurs in the thread to make it no longer gas tight. One reason for this is the tendency of the box and pin ends to curl as a reaction to the expansion force at the noses of the pin and the box. Solutions to address this problem have been proposed particularly at the pin end that focused on pre-stressing the pin end by bending it on makeup from the longitudinal axis with a groove formed at the base of the box. The box end was cantilevered on a fulcrum with the idea that expansion would make the box nose curl in against the pin while the retention of the pin nose by a groove in the box base would prevent curling in of the pin nose. These approaches to sealing the ends of a thread both against pressure within the tubular and pressure on the outside facing the annular space in a wellbore are illustrated in U.S. Pat. No. 7,585,002. The retention device for the pin end that was located on the box was a reverse shoulder 26. Its purpose was to plastically deform the pin end so that at a location away from the pin end a part of the pin wall could contact the box wall for sealing.

Another approach in the context of a two step thread was to put resilient seals between the steps and to further provide in association with the seals between the steps mating wicker surfaces with the idea that the expansion would squeeze the resilient seal and the wicker surfaces would hold together better than smooth overlapping surfaces that got pushed together as a swage was advanced through the threaded connection. Variations on this approach are illustrated in U.S. Pat. No. 6,792,665. One of the issues with resilient seals is temperature service limit. In deeper wells the operating temperatures can exceed 150° C. which approached or exceeded the service limit of most seal materials such as elastomers. The other issue was a lack of residual contact pressure in the area between the thread steps after expansion that limited the effectiveness of a metal to metal seal in that area. The radial expansion resulted in wall thinning to conserve volume and as result the force holding the mating metal surfaces between thread steps was reduced. A more effective way to hold the thread together during and after expansion was needed that would take into account the axial dimension changes that resulted from radial expansion as well as changes in wall dimensions. In the past, leakage has resulted from expansion of threaded connections because of the resulting pin and box separation along the thread as a result of the expansion process.

Still other designs relating to expanding threaded connections are illustrated in: U.S. Pat. No. 5,462,315; US 2007/0035131A1; U.S. Pat. No. 6,554,287B1; US 2003/0067166A1; US 2005/0236834A1;

U.S. Pat. Nos. 5,415,442 and 6,322,110. At least some of these references show the opposed projections on the pin and the box that overlap each other and contact upon makeup or on expansion. The present invention addresses this need by providing a mechanism to retain the connection together despite expansion where, in one embodiment, the threaded connection is retained together between steps while the retention device allows for relative axial movement between the pin and the box.

The present invention is for a connection that does not necessarily have to be expanded. The features of the invention can be employed to enhance sealing in a threaded connection even for connections that are simply threaded together with tongs and run into a subterranean location. These and other features of the present invention will become more apparent to those skilled in the art by a review of the detailed description of the preferred embodiment and the associated drawings while recognizing that the full scope of the invention is to be determined from the appended claims.

The following US Patents and Applications illustrate known thread forms that can be used in conjunction with the present invention: 2008/0277933; U.S. Pat. Nos. 7,588,269 and 6,254,146.

SUMMARY OF THE INVENTION

A retaining device for a threaded connection that optionally can be expanded holds the connection together to prevent leakage. In a two step thread the retention device is located between the steps and comprises a nose in a groove that holds aligned surfaces together for a metal to metal connection and allows for relative axial movement at the same time.

BRIEF DESCRIPTION OF THE DRAWINGS

FIG. 2 is a close up of FIG. 1 showing the result of expansion with at least one end free to move;

FIG. 3 is a close up view of FIG. 1 showing the results of expansion with both ends of the connection restrained from moving.

DETAILED DESCRIPTION OF THE PREFERRED EMBODIMENT

Figure 1:
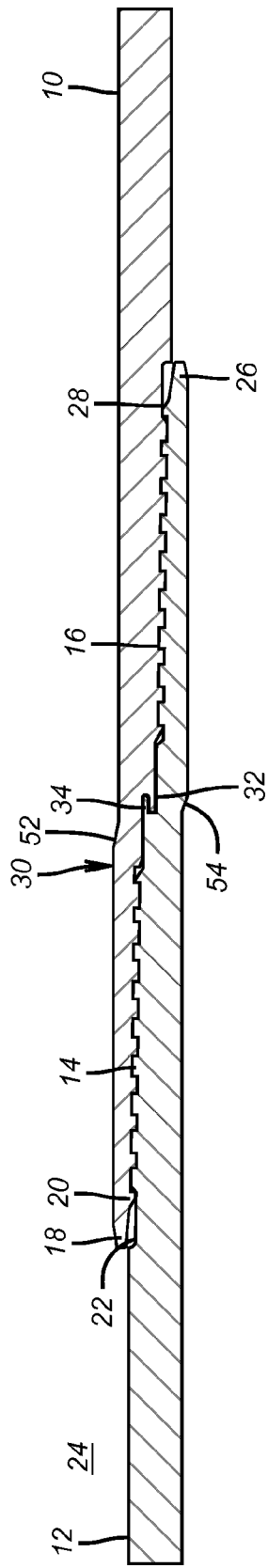
FIG. 1 is a section view of the connection made up and before expansion showing the retention between the steps in a two step thread.

FIG. 1 shows a box 10 connected to a pin 12. They are preferably connected by a two step thread 14 and 16. The box end 18 is preferably cantilevered about a fulcrum 20 with the intent that the end 18 will curl toward the pin 12 due to expansion and seal the gap 22 to the surrounding annular space 24. The pin end 26 is cantilevered about a fulcrum 28. While employing the invention in a two step thread is preferred the specific design of the thread form and the way the ends 18 and 26 are treated is not the focus of the invention.

Rather in a two stage thread application, which is the preferred embodiment, the invention focuses on features of the pin 12 and the box 10 that are disposed between the thread steps 14 and 16. Broadly stated there are interlocking shapes between the pin 12 and the box 10 that tolerate relative axial movement and hold the pin 12 to the box 10 in zone 30. The interlocking shapes in one form can be fingers or extending components 32 and 34 mounted respectively on the box 10 and the pin 12. The fingers 32 and 34 point in opposed directions so that when the pin 12 is made up to the box 10 finger 32 defines an annular groove 36 into which finger 34 enters. In the preferred embodiment on makeup and without expansion there is contact of surface 38 of finger 32 with surface 40 of the pin 10 on one side and contact with surface 42 of finger 32 with surface 44 of finger 34. This is more clearly seen in the close up views of FIG. 2 although that FIG. shows the expanded condition. Alternatively and within the scope of the invention, the fingers 32 and 34 can come into sealing contact initially after expansion is completed or during the expansion itself while maintaining sealing contact thereafter to the conclusion of the expansion. Similarly the finger 34 on the pin 12 also has a side surface 46 to contact surface 48 on the box 10. It is preferred that the initial fit of finger 34 in groove 36 and the fit of finger 32 in groove 50 is at least a clearance fit although an interference fit is preferred to maintain sufficient contact pressure for an effective gas tight metal to metal seal on makeup even without any expansion.

The side surfaces 44 and 46 could be parallel to each other or taper toward each other in a direction toward the end of finger 34 in groove 36. The same is the case for the corresponding finger 32. The rounded ends of fingers 32 and 34 facilitate the manufacturing process. It is intended that at makeup and after expansion the metal to metal seal is in the contact location for the fingers 32 and 34 along their sidewalls as they retain the expanded thread together whether it is a single step thread or a multiple step thread. The presence of the restraint that provided a metal to metal seal and allows for relative axial movement is applicable both at an end or both ends of a thread form as it is between steps of a multi-step thread form.

Referring back to FIG. 1 the box 10 has a taper 52 on its exterior located just below the lower end of thread 14. Pin 12 has a taper 54 about even with its finger 34. Those skilled in the art will appreciate that these tapers increase the wall thickness and are placed there to control stress concentration and to influence the fingers 32 and 34 to flex during expansion so that their respective longitudinal axes while remaining aligned with respect to each other are both skewed with respect to the longitudinal axis 56 of the connection. This skew angle of preferably under 15 degrees adds a component of force normal to the longitudinal axis of the fingers 32 and 34 to push them together and enhance the metal to metal seal that is between them. The skew helps to maintain seal contact during or after expansion or increase break out torque during or after expansion.

Those skilled in the art will also notice by comparing FIG. 1 to FIG. 2 or 3 that the finger tips as a result of expansion and relative axial movement induced by radial expansion have pulled away from the opposing bottoms of grooves 36 and 50 while holding some finger overlap to help maintain the metal to metal seal as between the fingers 32 and 34 contacting each other while holding together the thread forms 14 and 16 at the same time.

While overlapping fingers 32 and 34 are illustrated as the preferred technique of retaining a pin to a box between stepped threads other equivalent structures that accomplish this purpose are also contemplated. While the fingers can contact each other with metal to metal contact it is also possible to optionally add a groove to one or both fingers and still use a resilient seal or seals in conjunction with metal to metal contact between the fingers. While a two step thread is preferred the invention is applicable to more complex threads with more than two steps and even a single step thread with the fingers or other equivalent devices disposed at one or opposed ends of a single stage thread. The above description is illustrative of the preferred embodiment and many modifications may be made by those skilled in the art without departing from the invention whose scope is to be determined from the literal and equivalent scope of the claims below:

We claim:

1. A threaded connection for tubulars for subterranean use, comprising:

a pin having at least a one step pin thread thereon;

a box having at least a one step box thread thereon to engage said pin thread for holding said pin and box together as a result of relative rotation with said threads engaged that creates relative axial movement between said pin and box;

a metal to metal seal assembly having a first extending component extending integrally from said pin and a second extending component extending integrally from said box that come into sealing contact upon expansion of said pin and box;

said first extending component on said pin defines an adjacent pin groove on said pin into which extends said second extending component on said box, said second extending component on said box defines an adjacent box groove into which said first extending component on said pin extends, said pin and box grooves respectively have a pin and box bottom with said first component pulling away from said box groove bottom as a result of expansion and said second component pulling away from said pin groove bottom as a result of expansion;

said grooves each having an initial orientation after makeup and before expansion featuring opposed pairs of wall surfaces defined by said pin and said first extending component and by said box and said second extending component, wherein said groove wall surfaces are engaged by a respective said extending component such that each said pair of wall surfaces has surface contact on opposed sides from a respective extending component on makeup, said opposed wall surfaces as a pair then skew and remain skewed after said expansion with the respective said extending component that is initially engaged to said opposed wall surfaces and remains engaged during said skew to another orientation of said extending components during expansion of said extending components with respect to a longitudinal axis of said pin and box, said pulling away facilitating said skew while maintaining said wall surfaces in surface contact with said extending component therebetween.

2. The connection of claim 1, wherein:
said first and second extending components move past each other in an overlapping relationship on makeup.

3. The connection of claim 1, wherein:
said components remain in their respective grooves during expansion.

4. The connection of claim 3, wherein:
said components move relatively during expansion of said pin and box and maintain sealing contact after said expansion.

5. The connection of claim 1, wherein:
said components comprise elongated members with opposed parallel walls.

6. The connection of claim 1, wherein:
said pin extending component and said box extending component have adjacent walls that come together on makeup into at least a clearance fit.

7. The connection of claim 1, wherein:
said components comprise elongated members;
said pin extending component and said box extending component have adjacent walls that come together on expansion into at least an interference fit.

8. The connection of claim 1, wherein:
the amount of said skew is less than 15 degrees from an axis of said pin and box.

9. The connection of claim 1, wherein:
at least one of said pin and said box has a taper on an opposite wall from where said extending components are located to promote said skew.

10. The connection of claim 1, wherein:
said at least a one step thread on said pin comprises at least two spaced apart steps;
said at least a one step thread on said box comprises at least two spaced apart steps;
said first and second extending components are located respectively between said spaced step threads on said pin and said box.

11. The connection of claim 1, wherein:
said components move relatively during expansion of said pin and box and maintain sealing contact during expansion.

12. The connection of claim 1, wherein:
said skew assists in maintaining seal contact during or after expansion.

13. The connection of claim 1, wherein:
said skew assists in increasing break out torque during or after expansion.

14. The connection of claim 1, wherein:
said first and second extending components come into sealing contact during expansion.

\* \* \* \* \*